United States Patent Office 3,304,326
Patented Feb. 14, 1967

3,304,326
GUANIDINES
Oswald Schier, Birsfelden, Switzerland, assignor to Ciba Corporation, New York, N.Y., a corporation of Delaware
No Drawing. Filed Sept. 9, 1964, Ser. No. 395,311
Claims priority, application Switzerland, Sept. 20, 1963, 11,643/63; July 17, 1964, 9,422/64; Aug. 14, 1964, 10,647/64
23 Claims. (Cl. 260—551)

The present invention relates to new guanidines. Especially it concerns N-aminoaryl-N'-cyanoguanidines of the formula R—Ar—G, in which R represents an arylamino group, Ar an arylene radical and G an N'-cyanoguanidino group.

An arylene radical is primarily an at most binuclear arylene radical, such as a naphthylene group or preferably a phenylene group. The arylene group may be unsubstituted, mono- or polysubstituted. As suitable substituents there may be mentioned, for example, lower alkyl such as methyl, ethyl, propyl or isopropyl groups; straight or branched butyl, pentyl or hexyl groups linked in any desired position; lower alkoxy groups such as hydroxyl groups substituted by the afore-mentioned alkyl radicals, halogen such as chlorine, bromine or iodine atoms or trifluoromethyl groups. The arylene radical is preferably a meta- or ortho-arylene radical.

The aryl radical of the arylamino group is more especially an at most binuclear aryl radical such as a napthyl or preferably a phenyl radical. The aryl radical may be unsubstituted or substituted, for example as defined above for the arylene radical.

The nitrogen atom of the arylamino group may also be substituted, for example by an alkyl radical such as a lower alkyl radical, for example one of those mentioned above.

The cyanoguanidino group is advantageously unsubstituted, but it may also be substituted, more especially by lower alkyl groups, for example those mentioned above, for example at N''.

The new cyanoguanidines possess valuable pharmacological properties; more especially they have an antiinflammatory effect. In the animal test, for example on guinea pigs and rats, they have an antiinflammatory effect and display low toxicity. The new compounds may, therefore, be used as antiphlogistics. They are also suitable for use as intermediates, for example in the manufacture of pharmacologically valuable substances.

There may be mentioned more especially the compounds of the formula

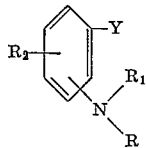

and particularly those of the formula

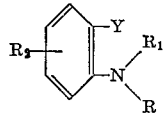

in which Y represents the N'-cyanoguanidino group, R stands for an unsubstituted or substituted phenyl radical, $R_1$ for hydrogen or a lower alkyl radical and $R_2$ for a hydrogen atom, a lower alkyl radical, a lower alkoxy radical, a halogen atom or a trifluoromethyl group, and more especially N-[2-(phenylamino)-phenyl]-N'-cyanoguanidine.

The new compounds are accessible by the known methods; advantageously, in a compound of the formula R—Ar—X, in which R and Ar have the above meanings and X represents an amino group containing at least one hydrogen atom, such as the amino group, this amino group is converted into a N'-cyanoguanidino group by reaction with a dicyanimide, particularly dicyanimide.

It is advantageous to delay the liberation of the dicyanimide until the reaction is in progress, starting from a metal salt of the dicyanimide, for example an alkali metal salt thereof, and liberating the dicyanimide by adding an acid, for example hydrochloric or sulfuric acid. On the other hand, when the compound of the formula R—Ar—X is reacted in the form of one of its acid addition salts, it is in most cases not necessary to add an acid to liberate the dicyanimide from its salts.

The reaction is performed in the usual manner, preferably in the presence of a solvent and/or diluent, in the presence of a condensing agent, at room temperature or with cooling or heating, under atmospheric or superatmospheric pressure. When R represents an arylamino group which contains a hydrogen atom attached to the nitrogen atom, the reaction is carried out under mild conditions in order to prevent undesired side reactions. In such a case it is of advantage to perform the reaction at a temperature ranging from 50 to 80° C., allowing the reactants to react from about 30 to 120 minutes.

According to another method for the preparation of the new compounds, a compound of the formula R—Ar—X in which R and Ar have the meanings given above and X represents an amino group containing at least one hydrogen atom, is reacted with an etherified cyanisothiourea. Etherified cyanisothioureas are more especially those which are etherified with lower alkanols or aralkanols.

The reaction is performed in the conventional manner, if desired in the presence of desulfurising agents, for example oxides or carbonates of heavy metals such as tin, lead, silver, zinc, cadmium or mercury, for example in the presence of lead oxide or mercury (II) oxide or basic lead (II) carbonate or of mercury chloride. The reaction is advantageously carried out at an elevated temperature and, if desired, under superatmospheric pressure, preferably in the presence of a solvent or diluent.

According to another method, the new compounds can be prepared by reacting a compound of the formula R—Ar—Y in which R and Ar have the meanings given above and Y represents a thioureido group, with the lead (II) salt of cyanamide. The reaction is carried out in the usual manner.

In resulting compounds other substituents may be introduced by conventional methods in the end products as defined herein. For example, in compounds which contain a cyanoguanidino group which may be substituted, a hydrogen atom in the latter may be replaced by a substituent, for example an alkyl radical, for example at the N nitrogen atom. The substitution of the cyanoguanidino group is carried out in the conventional manner, for example by reaction with a reactive ester of an appropriate alcohol, for example a lower alkanol. Reactive esters are particularly esters with strong inorganic or organic acids, for example hydrohalic acids, for example hydrochloric, hydroboromic or hydroiodic acid, sulfuric acid or arylsulfonic acids, for example para-toluene-, benzene- or para-bromo-benzene-sulfonic acid. The reaction is carried out in the customary manner, preferably in the presence of a basic condensing agent, such as an alkali metal hydroxide or carbonate.

The invention includes also any modification of the process in which an intermediate obtainable at any stage of the process is used as starting material and any remaining step or steps is/are carried out or the process is discontinued at any stage thereof, or in which the starting materials are formed under the reaction conditions, or in which the reactants may be used in the form of their salts.

The reactions according to the invention are preferably carried out with starting materials that yield the preferred compounds referred to above.

The starting materials are known or can be prepared by known methods.

The new compounds may be used as medicaments, for example in the form of pharmaceutical preparations containing them in admixture or conjunction with a solid or liquid organic or inorganic excipient suitable for enteral, parenteral or local administration. Suitable excipients are substances that do not react with the new compounds, for example water, gelatine, lactose, starches, stearyl alcohol, magnesium stearate, talcum, vegetable oils, benzyl alcohols, gums, propylene-glycols, white petroleum jelly, cholesterol or other known medicinal excipients. The pharmaceutical preparations may be, for example, tablets, dragees, capsules, ointments or creams, or in liquid form solutions, suspensions or emulsions. If desired, they may be sterilized and/or may contain assistants such as preserving, stabilizing, wetting or emulsifying agents, solution promoters, salts for regulating the osmotic pressure or buffers. They may also contain other therapeutically valuable substances. The pharmaceutical preparations are formulated by the conventional methods.

The new compounds may also be used in the form of feeding stuffs or additives to feeding stuffs, using, for example, the conventional extenders and diluents and feeding stuffs respectively.

The following examples illustrate the invention.

EXAMPLE 1

9.2 g. (0.05 mol) of ortho-aminodiphenylamine and 4.5 g. (0.05 mol) of sodium dicyanimide are stirred in 75 ml. of a mixture of methanol and water (3:1) at 75 to 80° C. At this temperature 10.5 ml. of hydrochloric acid (1:1) are dropped in with stirring within 15 minutes. On completion of the dropwise addition, the batch is stirred on for 15 minutes at 80° C. and then cooled with ice water to 0° C. The product which crystalizes out is filtered off and washed with ether and then with alcohol, to yield N-[2-(phenylamino)-phenyl]-N'-cyanoguanidine of the formula

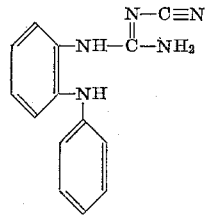

as a white powder which, after recrystallization from acetone or alcohol, melts at 208–210° C. with decomposition. The infrared spectrum of the free compound contains a strong band at 4.55µ.

EXAMPLE 2

4.3 g. (0.02 mol) of 2-amino-5-chlorodiphenylamine and 1.8 g. (0.02 mol) of sodium dicyanimide in 75 ml. of methanol are stirred at 50° C. 4.2 ml. of hydrochloric acid (1:1) are then dropped in at 50° C. within 60 minutes, and the batch is stirred on for 60 minutes at 50° C. Without filtering it, the reaction mixture is concentrated to half its volume under vacuum, the precipitate is filtered off and washed with water and then with alcohol, to yield N-[2-(phenylamino)-4-chlorophenyl]-N'-cyanoguanidine of the formula

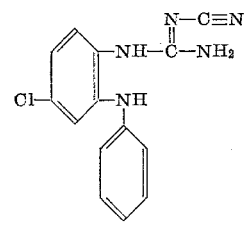

as a white powder which, after recrystallization from acetone or alcohol, melts at 233–235° C. with decomposition. Its infrared spectrum contains a strong band at 4.55µ.

EXAMPLE 3

4.3 g. (0.02 mol) of 2-amino-4-chlorodiphenylamine and 1.8 g. (0.02 mol) of sodium dicyanimide in 75 ml. of methanol are stirred at 50° C. In the course of 60 minutes at 50° C. 4.2 ml. of hydrochloric acid (1:1) are then dropped in and the batch is stirred on for 60 minutes at 50° C., without filtering concentrated to half its volume under vacuum, the precipitated product is filtered off and washed with water and then with alcohol, to yield N-[2-(phenylamino)-5-chlorophenyl]-N'-cyanoguanidine of the formula

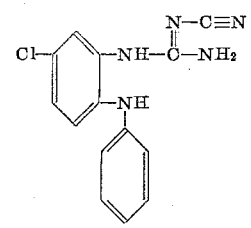

as a white powder which, after recrystallization from acetone or alcohol, melts at 205–207° C. with decomposition. Its infrared spectrum contains a strong band at 4.55µ.

EXAMPLE 4

4.3 g. (0.02 mol) of 2-amino-4'-chlorodiphenylamine and 1.8 g. (0.02 mol) of sodium dicyanimide in 75 ml. methanol are stirred at 50° C. In the course of 60 minutes at 50° C. 4.2 ml. of hydrochloric acid (1:1) are dropped in, and the mixture is stirred on for 60 minutes at 50° C., without being filtered evaporated to half its volume under vacuum, the precipitate is filtered off and washed with water and then with alcohol, to yield N-[2-(4-chlorophenylamino)-phenyl]-N'-cyanoguanidine of the formula

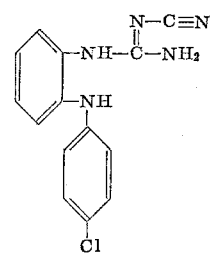

as a white powder which, after recrystallization from acetone or alcohol, melts at 182–184° C. with decomposition. Its infrared spectrum contains a strong band at 4.55µ.

EXAMPLE 5

4 g. (0.02 mol) of 2-amino-4-methyl-diphenylamine and 1.8 g. (0.02 mol) of sodium dicyanimide are stirred in 50 ml. of methanol at 70° C. 4.2 ml. of hydrochloric acid (1:1) are added dropwise in the course of 20 minutes, and stirring is continued for 30 minutes at 70° C.

The reaction mixture is cooled, diluted with an equal quantity of water and the precipitated product filtered. The latter is washed with water and alcohol to yield N - [2 - (phenylamino) - 5 - methylphenyl] - N' - cyanoguanidine of the formula

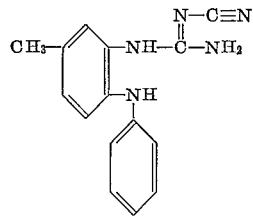

in the form of a white powder which, after recrystallization from acetone or alcohol, melts at 210–212° C. with decomposition.

EXAMPLE 6

4 g. (0.02 mol) of N-phenyl-N-methyl-ortho-phenylenediamine and 1.8 g. (0.02 mol) of sodium dicyanimide are stirred in 50 ml. of methanol at 70° C. 4.2 ml. of hydrochloric acid (1:1) are added dropwise in the course of 20 minutes, and stirring is continued for 30 minutes at 70° C. The reaction mixture is cooled, diluted with an equal quantity of water and the precipitated product filtered. The latter is washed with water and alcohol to yield N-[2-(N-methyl-phenylamino) - phenyl] - N'-cyanoguanidine of the formula

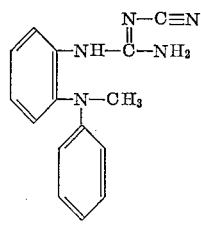

melting at 153–155° C.

EXAMPLE 7

4.2 g. (0.02 mol of 2-amino-2':3'-dimethyldiphenylamine and 1.8 g. (0.02 mol) of sodium dicyanimide are stirred in 50 ml. of methanol at 70° C. 4.2 ml. of hydrochloric acid (1:1) are added dropwise in the course of 20 minutes, and stirring is continued for 30 minutes at 70° C. The reaction mixture is cooled, diluted with an equal quantity of water and the precipitated product filtered. The latter is washed with water and alcohol to yield N - [2-((2:3-dimethylphenyl)amino)-phenyl]-N'-cyanoguanidine of the formula

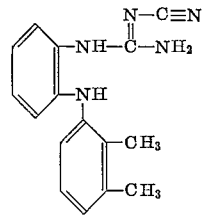

melting at 158–160° C.

EXAMPLE 8

4 g. (0.02 mol) of 2-methylaminodiphenylamine and 1.8 g. (0.02 mol) of sodium dicyanimide are stirred in 50 ml. of methanol at 70° C. 4.2 ml. of hydrochloric acid (1:1) are added dropwise in the course of 20 minutes, and stirring is continued for 30 minutes at 70° C. The reaction mixture is cooled, diluted with an equal quantity of water and the precipitated product filtered. The latter is washed with water and alcohol to yield N-[2-(phenylamino)-phenyl]-N-methyl-N' - cyanoguanidine of the formula

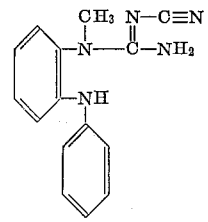

melting at 169–171° C.

EXAMPLE 9

3.7 g. (0.02 mol) of 4-aminodiphenylamine and 1.8 g. (0.02 mol) of sodium dicyanimide are stirred in 50 ml. of methanol at 70° C. 4.2 ml. of hydrochloric acid (1:1) are added dropwise in the course of 20 minutes, and stirring is continued for 30 minutes at 70° C. The reaction mixture is cooled, diluted with an equal quantity of water and the precipitated product filtered. The latter is washed with water and alcohol to yield N-[4-(phenylamino)-phenyl]-N'-cyanoguanidine of the formula

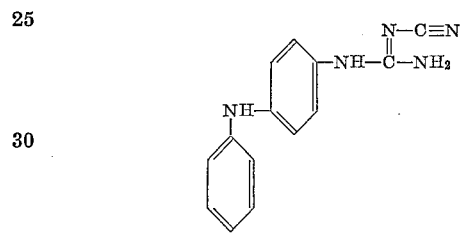

melting at 195–197° C.

EXAMPLE 10

10.4 g. (0.04 mol) of N-[2-(phenylamino)-phenyl]-N'-cyanoguanidine (see Example 1), 100 ml. of alcohol and a solution of 6 g. of sodium hydroxide in 15 ml. of water are stirred at 20° C. A solution of 12 ml. of dimethyl sulfate in 15 ml. of methanol is then added dropwise in the course of 20 minutes, with cooling to 20–25° C., and the batch is stirred for another 60 minutes at 20–25° C. after completion of the dropwise addition.

The reaction mixture is filtered, washed with methanol and the filtrate treated with 250 ml. of water. The precipitate is filtered off, washed with water and recrystallized from alcohol to yield N-[2-(phenylamino)-phenyl]-N-methyl - N' - cyanoguanidine which is identical with the product prepared according to Example 8.

EXAMPLE 11

2.7 g. (0.01 mol) of N-[2-(methylphenylamino)-phenyl]-N'-methyl-thiourea, prepared from N-phenyl-N-methyl-ortho-phenylenediamine and methyl isothiocyanate, are boiled under reflux with 2.6 g. of lead cyanamide and 50 ml. of alcohol for 24 hours. The batch is filtered while still hot, washed with alcohol and the filtrate evaporated in vacuo. The residue is repeatedly boiled mith methylene chloride, the methylene chloride extract evaporated and the resulting product recrystallized from a mixture of ether and alcohol to yield N-[2-(N-methylphenylamino) - phenyl]-N'-cyano-N''-methyl - guanidine of the formula

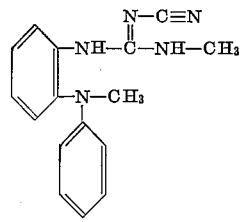

in the form of a white powder which, after recrystallization from a mixture of ether and petroleum ether, melts at 109–111° C.

EXAMPLE 12

4 g. (0.02 mol) of N-phenyl-N-methyl-ortho-phenylenediamine and 2.6 g. (0.02 mol) of N-methyl-N'-cyano-S-methyl isothiourea are heated at 140–150° C. in 30 ml. of alcohol for 10 hours. The reaction mixture is evaporated in vacuo, the residue boiled with methylene chloride and the methylene chloride extract evaporated in vacuo, to yield N-[2-(N-methyl-phenylamino)-phenyl]-N'-cyano-N''-methyl-guanidine which is identical with the product prepared according to Example 11.

EXAMPLE 13

6.6 g. (0.03 mol) of 3-aminodiphenylamine hydrochloride are dissolved in 70 ml. of methanol. 3.6 g. of sodium dicyanimide of 75% strength are then added in the course of 15 minutes with stirring at 80° C. bath temperature, and stirring is then continued for 15 minutes at a bath temperature of 80° C. The reaction is evaporated to half its volume in vacuo without being filtered, and 150 ml. of water are then added. The precipitate which settles out is then separated and triturated twice with 100 ml. of water each time. The resulting crystalline product is taken up in a mixture of ether and alcohol, filtered, and the filtrate evaporated in vacuo. The resulting evaporation residue is triturated with a little ether, the resulting crude product filtered off and crystallized from a mixture of ether and alcohol to yield N-[3-(phenylamino)-phenyl]-N'-cyanoguanidine of the formula

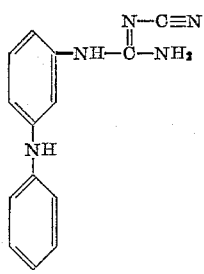

in the form of a white powder melting at 151–153° C. (with decomposition).

EXAMPLE 14

4.7 g. (0.02 mol) of N-(α-naphthyl)-ortho-phenylenediamine and 1.8 g. (0.02 mol) of sodium dicyanimide are stirred in 50 ml. of methanol at a bath temperature of 80° C. The reaction mixture is evaporated to half its volume in vacuo without being filtered, and 100 ml. of water are then added. The precipitate is repeatedly triturated with water, the resulting crystalline product filtered off, washed with a little alcohol and recrystallized from a mixture of alcohol and ether to yield N-[2-(α-naphthylamino)-phenyl]-N'-cyanoguanidine of the formula

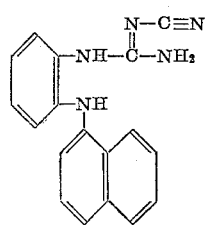

in the form of a white powder melting at 253–255° C.

EXAMPLE 15

Tablets containing 300 mg. of N-[2-(phenylamino)-phenyl]-N'-cyanoguanidine may be prepared with the following ingredients:

|  | Mg. per tablet |
|---|---|
| N-[2-(phenylamino)-phenyl]-N'-cyanoguanidine | 300.0 |
| Wheat starch | 50.0 |
| Lactose | 50.0 |
| Colloidal silicic acid with hydrolysed starch | 25.0 |
| Arrowroot | 57.5 |
| Talc | 15.0 |
| Magnesium stearate | 2.5 |
|  | 500.0 |

*Method*

N-[2-(phenylamino)-phenyl]-N'-cyanoguanidine, wheat starch and lactose are mixed homogeneously. The mixture is then moistened until a plastic mass is formed. The colloidal silicic acid with hydrolysed starch is then worked in in portions and the whole kneaded until a granulable mass is formed. This mass is passed through a sieve having a mesh of 2–5 mm. and dried at 45° C. The dry ganulate is then passed through a sieve having a 1 mm. mesh, and arrowroot, talc and magnesium stearate are homogeneously mixed in as outer phase. Tablets are prepared from the granulate in the customary manner having a gross weight of 500 mg.

What is claimed is:

1. A compound of the formula

in which R'' stands for a member selected from the group consisting of unsubstituted naphthyl and naphthyl substituted by a member selected from the group consisting of lower alkyl, lower alkoxy, halogen and trifluoromethyl, R' stands for a member selected from the group consisting of hydrogen and lower alkyl, Ar stands for a member selected from the group consisting of phenylene, lower alkyl-phenylene, lower alkoxy-phenylene, halogeno-phenylene and trifluoromethylphenylene and G for a member selected from the group consisting of unsubstituted N'-cyanoguanidino and N'-cyanoguanidino substituted by lower alkyl.

2. A compound of the formula

in which Ph stands for a member selected from the group consisting of unsubstituted phenyl and phenyl substituted by a member selected from the group consisting of lower alkyl, lower alkoxy, halogen and trifluoromethyl, R' stands for a member selected from the group consisting of hydrogen and lower alkyl, Ar stands for a member selected from the group consisting of phenylene, lower alkyl-phenylene, lower alkoxy-phenylene, halogenophenylene and trifluoromethylphenylene and G for a member selected from the group consisting of unsubstituted N'-cyanoguanidino and N'-cyanoguanidino substituted by lower alkyl.

3. A compound as claimed in claim 2, in which phenylene means para-phenylene.

4. A compound as claimed in claim 2, in which phenylene means meta-phenylene.

5. A compound as claimed in claim 2, in which phenylene means ortho-phenylene.

6. A compound of the formula

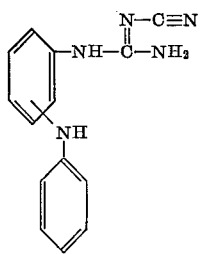

7. A compound of the formula

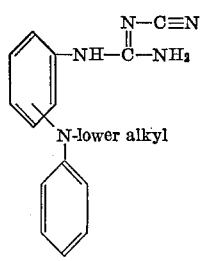

8. A compound of the formula

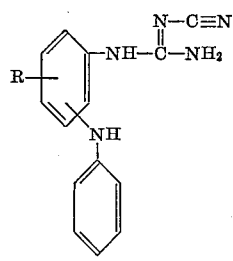

in which R stands for halogen.

9. A compound of the formula

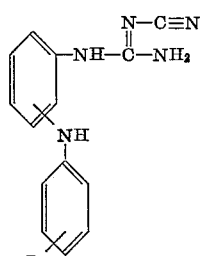

in which R stands for halogen.

10. A compound of the formula

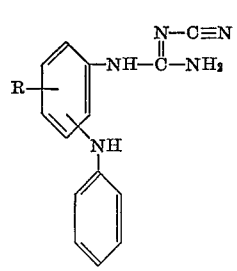

in which R stands for lower alkyl.

11. A compound of the formula

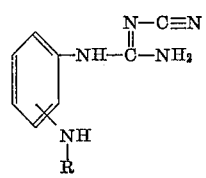

in which R stands for lower alkylated phenyl.

12. N-[2-(phenylamino)-phenyl]-N'-cyanoguanidine.
13. N-[2-(phenylamino)-4-chlorophenyl] - N'-cyanoguanidine.
14. N-[2-(phenylamino)-5-chlorophenyl] - N'-cyanoguanidine.
15. N-[2-(4-chlorophenylamino)-phenyl]-N' - cyanoguanidine.
16. N-[2-(phenylamino)-5-methylphenyl]-N' - cyanoguanidine.
17. N-[2-(N-methyl-phenylamino)-phenyl]-N' - cyanoguanidine.
18. N-[2-((2:3-dimethylphenyl)-amino)-phenyl] - N'-cyanoguanidine.
19. N-[2-(phenylamino)-phenyl]-N-methyl-N' - cyanoguanidine.
20. N-[4-(phenylamino)-phenyl]-N'-cyanoguanidine.
21. N-[2 - (N - methyl - phenylamino)-phenyl] - N'-cyano-N''-methylguanidine.
22. N-[3-(phenylamino)-phenyl]-N'-cyanoguanidine.
23. N-[2-(α-naphthylamino) - phenyl]-N' - cyanoguanidine.

No references cited.

WALTER A. MODANCE, *Primary Examiner.*

H. I. MOATZ, *Assistant Examiner.*